April 21, 1942.    W. A. DERR    2,280,144
SIGNALING SYSTEM
Filed July 19, 1940
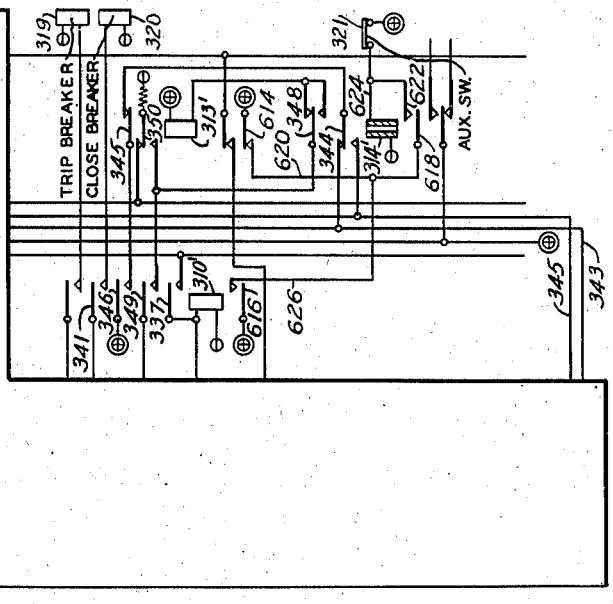
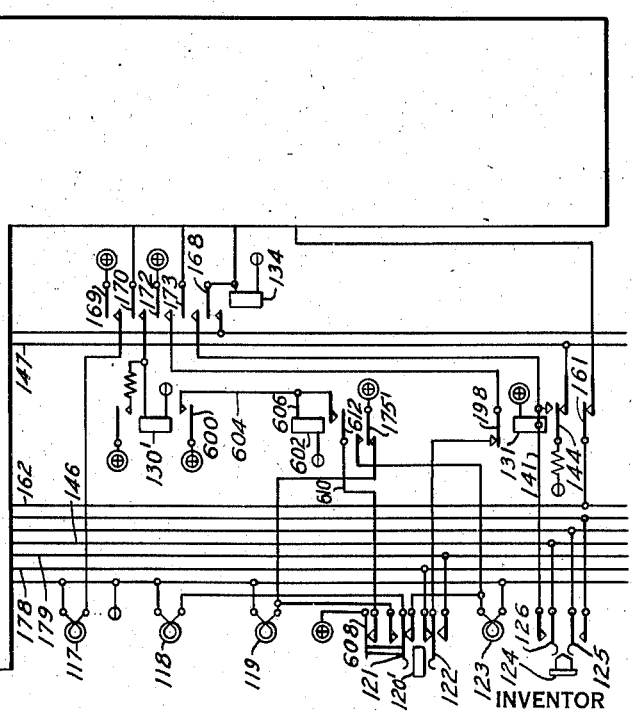
WITNESSES:
N. F. Susser.
Joe Weber.
INVENTOR
Willard A. Derr.
BY
ATTORNEY Patented Apr. 21, 1942

2,280,144

UNITED STATES PATENT OFFICE 2,280,144

SIGNALING SYSTEM

Willard A. Derr, Wilkinsburg, Pa., assignor to Westinghouse Electric & Manufacturing Company, East Pittsburgh, Pa., a corporation of Pennsylvania Application July 19, 1940, Serial No. 346,329

4 Claims. (Cl. 177—353)

My invention relates, generally, to signaling systems, and, more particularly to remote signaling systems such as supervisory control systems.

In the operation of supervisory control systems, such as that described in detail in the patent to Hans P. Boswau, No. 2,091,301, issued August 31, 1937, certain of the selective points are employed to perform the dual functions of control and supervision of remotely disposed apparatus. Such remotely disposed apparatus as circuit breakers often have associated with them means for automatically operating the apparatus when certain predetermined conditions obtain and very quickly thereafter automatically restoring the apparatus to normal.

In such systems, when the remote apparatus operates, coding impulses are transmitted to the control station to select and operate indicating means at the control station to indicate that apparatus has operated and to indicate the position of the particular apparatus. If, however, the remote apparatus is automatically returned to normal before the indication of the operation of the particular apparatus can be observed by the operator at the control station, the indicating apparatus will be changed to indicate the normal condition of the apparatus and the operator will be unable to determine which of several remote apparatus units has operated. The apparatus may, in fact, operate and return to normal so rapidly that the operation signal may not reach the control station before it is interrupted and displaced by the normal signal thus failing to give any indication at the control station of which apparatus unit has operated at the remote station.

An object of my invention is to provide a signaling system which shall function to indicate at a control station the operation of apparatus at a remote station and retain such indication regardless of the return of the apparatus to normal condition.

Another object of the invention is to provide a signaling system which shall function to give an indication at a control station of the change of position of apparatus at a remote station even though there is but a momentary change of position of the apparatus, and which shall function to retain the indication until it is released by the operator at the control station.

A further object of the invention is to so modify and utilize known signaling and supervisory control apparatus as to cause it to function to give and retain a positive indication, at a control station, of the change of position of apparatus at a remote station, even though there is but a momentary change of position of the apparatus, at the remote station, and which shall utilize certain of the apparatus of the known signaling and supervisory control apparatus to release the indication at the control station.

These and other objects and advantages of the invention will be apparent from the following detailed description taken in connection with the accompanying drawing, comprising a single figure which is a diagrammatic representation of a supervisory control system embodying the principal features of the invention.

In practicing the invention I utilize the principles and apparatus of any known supervisory control system that functions to selectively control position indicating devices at a control station in accordance with the position of an apparatus unit at a remote station, and which may be selectively controlled from the control station to selectively actuate apparatus at the remote station. In order to clearly and simply disclose and explain my invention, it will be described herein as related to and utilizing the principles and apparatus of the system of the aforementioned Patent No. 2,091,301, the patented system being modified in certain respects to provide the functioning for carrying out the objects of my invention. It is to be understood, however, that the principles of my invention may also be applied to other well known forms of supervisory control systems.

In the Patent No. 2,091,301 there is shown a system which may be utilized to select, control and supervise from a dispatcher's office or control station a plurality of circuit breakers or other apparatus units that may be caused to move to either of two positions such as open and closed, normal and actuated, etc. The system disclosed by the patent functions to control the position of the remote apparatus by the operation of an individual point control key, then the operation of an individual point operate key, and then the operation of a master control key. This will cause the energization of the selected trip or close relay at the selected point or apparatus. The change of position of the controlled apparatus controls a supervising relay which, in turn, causes the selection and operation of an indicating signal at the control station to indicate to the dispatcher the position of the controlled apparatus. These elements of apparatus are identified in the drawings of the Patent No. 2,091,301 for the fourth point as follows: point control key 120, point operate key 124, master control key 101, trip or open relay 319, close relay 320, supervising relay 314, "trip" or "open" signal 123 and "close" signal 119. For a more complete description of the operation of these elements of apparatus and the associated selective control system, reference is made to the specification and drawings of Patent No. 2,091,301 in which the complete system is described in detail.

Since an object of my invention is to so modify and utilize signaling and control apparatus as exemplified by the system disclosed and described by the Patent No. 2,091,301 as to utilize a point of the patented system for the indication and retention of the indication at a control station of an operation at a remote station, I have shown in my drawing only the parts of the system which directly enter into the desired functioning and the modifications of the apparatus necessary to produce the desired functioning. The elements shown on my drawing that are identical with the parts of the system of the Patent No. 2,091,301 bear the same reference characters as those of the patent drawing and elements of apparatus that have been modified or altered have similar reference characters. The remainder of the system which is identical with that of Patent No. 2,091,301, is shown boxed at the control and remote stations and connected by the single pair of line conductors 219—223, and reference is made to this patent for the details of this structure and its operation.

In order to provide the structure that will function in the desired manner, the selective point 4 of the system of the Patent No. 2,091,301 has been altered in a manner which will be apparent from the following description.

At the control station, there is provided a signal control relay 130' which corresponds to the signal control relay 130 of the patent. The polarity of the potentials applied to the winding of the relay 130' and its upper front contact armature are opposite to the potentials applied to these elements of the relay 130 of the patent, so that the relay 130' is energized and locked up by a "trip" or "open" signal code and deenergized or dropped out by a "close" signal code. The relay 130' is also provided with a front contact armature 600 which controls an energizing circuit for an auxiliary signal control relay 602, which circuit extends from positive battery through the front contact armature 600, conductors 604 and 606, and the winding of the auxiliary signal control relay 602 to negative battery.

The auxiliary signal control relay 602 has a contact armature 175' which functions in the manner of the armature 175 of the Patent No. 2,091,301 to control back and front contact elements and associated circuits which, in turn, control the "close" and "open" signal lamps 119 and 123, respectively. A point control key 120' has all of the elements of the point control key 120 of the Patent No. 2,091,301 and has an additional contact element 608 which is in closed circuit position when the point control key 120' is in "close" position as indicated in the drawing.

The contact element 608 is connected in a holding circuit for the auxiliary signal control relay 602 which extends from positive battery through the contact element 608, conductor 610, a front contact armature 612 of the relay 602, and conductors 604 and 606 through the winding of the auxiliary signal control realy 602 to negative battery.

At the remote station or substation, a starting relay 313' has the same contact armatures and is controlled in the same manner as the starting relay 313 of the Patent No. 2,091,301, and in addition has a back contact armature 614.

A code control operating relay 310' is similar to the code control operating relay or point relay 310 of the Patent No. 2,091,301 and, in addition, has a front contact armature 616.

A supervising relay 314' has the same control elements and functions of the supervising relay 314 of the Patent No. 2,091,301 and, in addition, has a front contact armature 618 which is part of holding circuits for the relay 314'. One holding circuit for the supervising relay 314' extends from positive battery through the back contact armature 614 of the starting rely 313', the conductor 620, the front contact armature 618 of the relay 314', conductors 622 and 624 and the winding of the supervising relay 314' to negative battery. Another holding circuit for the supervising relay 314' extends from positive battery through the front contact armature 616 of the relay 310', the conductors 626 and 620, the contact armature 618, conductors 622 and 624, and the winding of the supervising relay 314' to negative battery.

An energizing circuit for the supervising relay 314' extends from positive battery through auxiliary contact element 321, conductor 624 and the winding of the supervising relay 314' to negative battery. It is to be understood that the auxiliary contact element 321 may be any suitable contact element operated in accordance with the movement of any element or apparatus unit at the remote station whose position it is desired to supervise. The principles of my invention being particularly adapted to be used for the supervision of a remotely disposed element which may move from normal position to operated position and immediately thereafter be returned to normal position, the invention will be described as applied to a remotely disposed automatic-reclosing circuit breaker. Since automatic-reclosing control systems for circuit breakers are common and well known in the art, it is deemed unnecessary to describe such a complete system in this application, and it will be understood, therefore, that the contact element 321 is a part of an auxiliary switch which closes when an automatic reclosing circuit breaker is open and opens when the circuit breaker is closed, and that the relays 319 and 320 are control relays selectively operable by the supervisory control system to cause the circuit breaker to trip and close, respectively, as described in the hereinbefore referred to Patent No. 2,091,301.

In the operation of the system, with the circuit breaker or other element that is to be controlled and supervised in its closed or normal position, the contact element 321 will be in open circuit position, the supervising relay 314' will be deenergized or dropped, the starting relay 313' will be energized or picked up, the code control operating relay 310' will be deenergized or dropped, the point selecting relay 134 at the control station will be deenergized or dropped, the signal control relay 130' and the auxiliary signal control relay 602 will be deenergized or dropped, and the point control key 120' will be in the "close" position indicated in the drawing. Under these conditions the "close" indicating lamp 119 will be connected in its energizing circuit through the contact armature 175' of the auxiliary signal control relay 602 in engagement with its cooperating back contact element.

If, now, the circuit breaker that is being supervised is tripped and moves to open position, the contact element 321 will move to closed circuit position completing the energizing circuit for the supervising relay 314'. When the supervising relay 314' moves its contact armature 348 from back contact to front contact position the holding circuit of the starting relay 313' is opened causing the contact armatures 350 and 614 of the relay 313' to move to back contact position. The holding circuit for the supervising relay 314' will thus be completed and the relay 314' will remain energized even though the contact element 321 be moved to open circuit position by the immediate reclosure of the circuit breaker that is being supervised.

When the contact armature 350 of the starting relay 313' engages its cooperating back contact element, the coding, selecting, and control apparatus at the substation will actuate the point selecting relay 134 at the control station and send a checking code back to the substation to energize the code control operating relay 310' as fully explained in the hereinbefore referred to Patent No. 2,091,301.

The energization of the code control operating relay 310' will cause its contact armature 616 to complete a second holding circuit for the supervising relay 314' and will cause the coding, selecting, and control apparatus at the substation and the control station to energize the signal control relay 130' at the control station and to reenergize the starting relay 313'. The energization of the signal control relay 130' will cause it to close its holding circuit through its upper contact armature and the energizing circuit for the auxiliary signal control relay 602 through its contact armature 600. The auxiliary signal control relay 602 will close its holding circuit through its contact armature 612 and will deenergize the "close" indicating lamp 119 and energize the "open" indicating lamp 123 by the movement of the contact armature 175' of the relay 602 from engagement with its lower cooperating contact element to engagement with its upper cooperating contact element.

After the actuation of the signal relay 130', the relays 134 and 310' will be returned to normal and the system will be ready for another selective operation. When the relay 310' is deenergized, its contact armature 616 will move to open circuit position to thus open the holding circuit of the supervising relay 314'. If, at this time, the circuit breaker has not reclosed, the contact element 321 will still be in closed circuit position, the supervising relay 314' will remain energized, and no further operation will take place. If the circuit breaker has reclosed, the contact elements 321 will have moved to open circuit position and the supervising relay 314' will be deenergized when its holding circuit is opened by the contact armature 616 of the relay 310'. If the circuit breaker has not closed when the coding, selecting, and control apparatus is reset but recloses thereafter, when it closes, the supervising relay 314' will be deenergized by the movement of the contact element 321 to open circuit position to open the energizing circuit of the relay 314'.

In either of these latter two events, the deenergization of the supervising relay 314' will cause the coding, selecting, and control apparatus at the remote and control stations to deenergize the signal control relay 130' at the control station. The deenergization of the signal control relay 130' will not, however, cause a change in the signal indication since the auxiliary signal control relay 602 will remain energized through its holding circuit hereinbefore described.

The "open" signal will thus be given and retained at the control station as a result of the opening of the circuit breaker at the remote station regardless of whether or not the circuit breaker recloses again and regardless of how quickly it recloses. If, now, the operator at the control station, observing that the supervised circuit breaker has opened, desires to ascertain whether it has properly reclosed again, he will turn the point control key 120' from the "close" position shown in the drawing to the "trip" or "open" position. This operation of the point control key 120' will move the contact element 608 to open circuit position thus opening the holding circuit of the auxiliary signal relay 602. If the circuit breaker at the remote station has not reclosed, the signal relay 130' will still be energized, as hereinbefore described, holding the auxiliary signal relay 602 energized through the contact armature 600 of the signal relay 130'. If the circuit breaker at the remote station has reclosed, the signal relay 130' will be deenergized and the auxiliary signal relay 602 will be deenergized when the contact element 608 of the point control key 120' is moved to "open" position. The deenergization of the auxiliary signal control relay 602 will change the signal indication by deenergizing the "open" signal lamp 123 and energizing the "close" signal lamp 119. The point control key 120' may now be returned to the "close" position shown in the drawing and the system will be in normal condition.

It is to be understood that the usual station alarm for indicating an operation and a disagreement lamp 118, the functioning of which is fully described in the aforementioned Patent No. 2,091,301, may be employed with the rest of the system described herein.

Thus it will be seen that I have provided a signaling system which shall function in conjunction with known signaling and supervisory control apparatus to give an indication at a control station of the change of position of apparatus at the remote station even though there be but a momentary change of position of the apparatus, and which shall function to retain the indication until it is released by the operator at the control station.

In compliance with the requirements of the patent statutes, I have shown and described herein the preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In a supervisory control system having a controllable element at a remote station, circuit control means including a plurality of separately operable circuit control devices at a control station, control means responsive to the operation of a plurality of the circuit control devices for selectively actuating the controllable element to normal and operated positions, means at the remote station for automatically moving the controllable element to operated position and thereafter to normal position, indicating means at the control station, means responsive to the movement of the controllable element to operated position for actuating said indicating means even though the controllable element is returned to normal position before said indicating means is actuated, holding circuit means for retaining the actuation of said indicating means, and means operable the actuation of one of the circuit control devices at the control station to which the said control means is responsive for rendering said retaining means ineffective in the event that the controllable element has returned to normal position.

2. In a supervisory control system having a controllable element at a remote station, circuit control means including a plurality of separately operable circuit control devices at a control station, control means responsive to the operation of a plurality of the circuit control devices for selectively actuating the controllable element to normal and operated positions, means at the remote station for automatically moving the controllable element to operated position and thereafter to normal position, a signaling relay at the control station, means responsive to the position of the controllable element for selectively actuating said signaling relay including means for actuating said signaling relay when the controllable element moves to one of its positions even though it be moved to the other position before said signaling relay is energized, indicating means at the control station responsive to said signaling relay, holding circuit means for retaining the actuation of said indicating means, and means responsive to the actuation of one of the said circuit control devices to which said control means is responsive for rendering said retaining means ineffective.

3. In a supervisory control system having a controllable element at a remote station, circuit control means including a plurality of separately operable circuit control devices at a control station, control means responsive to the operation of a plurality of the circuit control devices for selectively actuating the controllable element to normal and operated positions, means at the remote station for automatically moving the controllable element to operated position and thereafter to normal position, a signaling relay at the control station, means responsive to the position of the controllable element for selectively actuating said signaling relay including means for actuating said signaling relay when the controllable element moves to one of its positions even though it be moved to the other position before said signaling relay is energized, an auxiliary relay at the control station responsive to said signaling relay, indicating means responsive to said auxiliary relay, a holding circuit for said auxiliary relay, and means responsive to the actuation of one of the said circuit control devices to which said control means is responsive for opening said holding circuit.

4. In a supervisory control system having a controllable element at a remote station, circuit control means including a plurality of separately operable circuit control devices at a control station, control means responsive to the operation of a plurality of the circuit control devices for selectively actuating the controllable element to normal and operated positions, a first relay at the remote station, an energizing circuit for said first relay, means for closing and opening said energizing circuit in accordance with the movement of the said movable element to one and the other of its positions, a signaling relay at the control station, control means for energizing said signaling relay when said first relay is energized including means for energizing said signaling relay even though the said energizing circuit for said first relay is opened by the movement of the movable element to its other position, control means responsive to the deenergization of said first relay for deenergizing said signaling relay, an auxiliary relay at the control station responsive to said signaling relay, indicating means controlled by said auxiliary relay, and holding circuit means for said auxiliary relay, including a contact element of one of said plurality of separately operable circuit control devices to which the said control means is responsive.

WILLARD A. DERR.